US006532272B1

United States Patent
Ryan et al.

(10) Patent No.: US 6,532,272 B1
(45) Date of Patent: Mar. 11, 2003

(54) RAM-SEARCH PROCESSOR FOR INTERSYMBOL INTERFERENCE CANCELLATION

(75) Inventors: William E. Ryan, Oro Valley, AZ (US); Ali Ghrayeb, Tucson, AZ (US)

(73) Assignee: New Mexico State University Technology Transfer Corporation, Las Cruces, NM (US)

( * ) Notice: Subject to any disclaimer, the term of this patent is extended or adjusted under 35 U.S.C. 154(b) by 0 days.

(21) Appl. No.: 09/373,919

(22) Filed: Aug. 12, 1999

Related U.S. Application Data

(60) Provisional application No. 60/096,284, filed on Aug. 12, 1998.

(51) Int. Cl.$^7$ .............................. H03D 1/06; H03D 11/04; H03K 5/01; H03K 6/04; H04B 1/10
(52) U.S. Cl. ............................ 375/348; 375/233; 360/65
(58) Field of Search ................................ 375/348, 233, 375/229, 231, 232, 341; 333/18; 360/65; 708/323

(56) References Cited

U.S. PATENT DOCUMENTS

| | | | |
|---|---|---|---|
| 4,852,090 A | | 7/1989 | Borth |
| 5,107,378 A | | 4/1992 | Cronch et al. |
| 5,132,988 A | | 7/1992 | Fisher et al. |
| 5,166,914 A | | 11/1992 | Shimada et al. |
| 5,414,571 A | | 5/1995 | Matsushige et al. |
| 5,418,660 A | | 5/1995 | Sato et al. |
| 5,426,541 A | | 6/1995 | Coker et al. |
| 5,430,661 A | | 7/1995 | Fisher |
| 5,490,169 A | * | 2/1996 | Blackwell et al. .......... 375/232 |
| 5,703,903 A | | 12/1997 | Blanchard et al. |
| 5,742,642 A | | 4/1998 | Fertner |
| 5,907,497 A | * | 5/1999 | Raghunath ................. 375/232 |
| 5,917,855 A | * | 6/1999 | Kim ........................... 375/229 |
| 6,104,766 A | * | 8/2000 | Coker et al. ................ 375/341 |

OTHER PUBLICATIONS

Ryan et al, "Viterbi Detector for PR4–Equalized Magnetic Recording Channels With Transition–Shift and Partial–Erasure Nonlinearities", IEEE Transactions, Sep. 1996, pp. 3950–3952.*

Agazzi, O.E., et al., "On the Use of Tentative Decisions to Cancel Intersymbol Interference and Nonlinear Distortion (with Application to Magnetic Recording Channels," *IEEE Transactions on Information Theory*, vol. 43, No. 2, pp 394–408, (Mar. 1997).

Bergmans, J.W.M., "Digital Baseband Transmission and Recording.—chapter 7.7 Sequence Feedback," *Philips Research, Eindhoven, Netherlands* (Kluwer Academic Publishers) pp 324–372 (1996).

Bergmans, J., "Discrete–Time Models for digital Magnetic Recording," *Philips J. Res.*, vol. 41, pp 531–558 (1986).

Bahl, L.R., et al., "Optimal Decoding of Linear Codes for Minimizing Symbol Error Rate," *IEEE Transactions on Information Theory*), pp 284–287 (Mar. 1974).

(List continued on next page.)

Primary Examiner—Phuong Phu
(74) Attorney, Agent, or Firm—Andrea L. Maya; Jeffrey D. Myers

(57) ABSTRACT

A method of canceling intersymbol interference (ISI) for a signal bit $a_k$ at time k, where $k \in \{0, \pm 1, \pm 2, \ldots\}$ in data transmission and data storage channels, by modelling the channel; training a RAM with known values for $a_k$ to acquire the model of the channel; searching for the optimal address for the RAM, with past, present, and future values of $a_k$, to be used in minimizing the ISI in the received signal; and canceling ISI from the received signal. A RAM-search method and apparatus is presented which operates in cooperation with Viterbi detection and decoding, as well as with BCJR-APP detection and decoding.

30 Claims, 6 Drawing Sheets

OTHER PUBLICATIONS

Choi, S., et al., "Performance of Neural Equalizers on Partial Erasure Model," *IEEE Transactions on Magnetics,* vol. 33, No. 5, pp 2788–2790 (Sep. 1997).

Fisher, K.D., et al., "An Adaptive RAM–DFE for Storage Channels," *IEEE Transactions on Communications,* vol. 39, No. 11, pp 15591568 (Nov. 1991).

Fossorier, M. P.C., et al., "Simplified Trellis Diagram for a Simple Partial Erasure Model," *IEEE Transactions on Magnetics,* vol. 34, No. 1, pp 320–322 (Jan. 1998).

Ghrayeb, A., et al., "Ram–Search Algorithms for Nonlinear ISI Cancellation in Magnetic Recording," *GLOBECom* Sydney, Australia (Nov. 1998).

LeBlanc, J.P., et al., "Pre–Cursor Extended Ram–DFE Canceller (PERC) Nonlinear Equalizer for Nonlinear ISI Channels," *IEEE DSP Workshop,* Bryce Canyon, Utah (Aug. 1998).

Lee, I., et al., "Performance Comparison of Receivers in a Simple Partial Erasure Model," *IEEE Transactions on Magnetics,* vol. 30, No. 4, pp 1465–1469 (Jul. 1994).

Liu, B., et al., "the Effect of MR Head Nonlinearity on MDFE and PRML Performance," *IEEE Transactions on Magnetics,* vol. 33, No. 5, pp 2764–2766 (Sep. 1997).

Newby, P., et al., "The Effects of Nonlinear Distortion on Class IV Partial Response," *IEEE Transactions on Magnetics,* vol. MAG–22, No. 5, pp 1203–1205 (Sep. 1986).

Ong, S., et al., "A Decision Feedback Recurrent Neural Equalizer for Digital Communication," *IEEE Transactions on Magnetics,* vol. 33, No. 5, pp 2767–2768 (Sep. 1997).

Ryan, W.E., "Viterbi Detector for PR4–Equalized Magnetic Recording Channels with Transition–Shift and Partial–Erasure Nonlinearities," *IEEE Transactions on Magnetics,* vol. 32, No. 5, pp 3950–3952 (Sep. 1996).

Ryan, W.E., et al., "Performance of Adaptive Volterra Equalizers on Nonlinear Magnetic Recording Channels," *IEEE Transactions on Magnetics,* vol. 31, No. 6, pp 3054–3056 (Nov. 1995).

Ryan, W.E., et al., "A Study of Class I Partial Response Signaling for Magnetic Recording," *IEEE Transactions on Magnetics,* vol. 33, No. 6, pp 4543–4550 (Nov. 1997).

Sugawara, T., et al., "A Nonlinear Model for Magnetic Recording Channel with an MR Head," *IEEE Transactions on Magnetics,* vol. 34, No. 1, pp 57–62, (Jan. 1998).

Torabi, A.F., et al., "Effect of MR Head Non–Linearities on Extracted Dipulse Response," *IEEE Trans. Magnetics,* vol. 33, No. 5, pp 4194–4208 (Sep. 1997) Abstract publ'd IEEE "ET–19".

Tyner, D.J., "Partial Response Equalizer Performance in Digital Magnetic Recording Channels," *IEEE Transactions on Magnetics,* vol. 29, No. 6, pp 4194–4208 (Nov. 1993).

Viterbi, A.J., "An Intuitive Justification and a Simplified Implementation of the MAP Decoder for Convolutional Codes," *IEEE Journal on Selected Areas in Communications,* vol. 16, No. 2, pp 260–264 (Feb. 1998).

\* cited by examiner

RAM-SEARCH PROCESSOR FOR INTERSYMBOL INTERFERENCE CANCELLATION

CROSS-REFERENCE TO RELATED APPLICATIONS

This application claims the benefit of the filing of U.S. Provisional Patent Application Serial No. 60/096,284, entitled "RAM-Search Algorithms for Nonlinear ISI Cancellation in Magnetic Recording," filed on Aug. 12, 1998, and the specification thereof is incorporated herein by reference.

GOVERNMENT RIGHTS

The U.S. Government has a paid-up license in this invention and the right in limited circumstances to require the patent owner to license others on reasonable terms as provided for by the terms of National Science Foundation Grant NCR9409749.

BACKGROUND OF THE INVENTION

1. Field of the Invention (Technical Field)

The present invention relates to the reduction of intersymbol interference that occurs in closely-spaced data symbols in data transmission and data storage channels.

2. Background Art

One negative consequence of ever-increasing (linear) recording densities is the ubiquitous nonlinear distortion arising from closely-spaced recorded transitions. Among the dominant effects are partial erasure, for magneto-inductive heads, pulse asymmetry and saturation, for magneto-resistive heads, and transition shifting for both.

A number of methods for mitigating against nonlinear intersymbol interference (ISI) have been examined in recent years, including the random access memory-decision feedback equalizer (RAM-DFE), various RAM ISI-cancellers, various sequence detectors, neural network-based ISI-cancellers and Volterra equalizers. All of these techniques suffer from either high complexity or marginal effectiveness.

Communications through nonlinear ISI channels continues to be of great interest as available spectrum becomes scarce, pushing for greater bandwidth efficiency. Additionally, the need for power efficiency, such as for hand-held wireless devices or satellite transponders, often requires the use of power amplifiers running in the saturation region. Unfortunately, within such a bandlimited nonlinear environment, typical methods to increase data rate such as faster symbol rates or higher order modulation schemes suffer greatly. In many nonlinear channels, the distortion caused by the nonlinear element, such as a nonlinear power amplifier and bandlimiting filters, creates nonlinear ISI. Such distortion typically limits the system to low order constellations such as PSK. Higher order constellations are possible only if effective reduction of the nonlinear ISI is achieved.

Various proposed solutions have varying degrees of success. One method proposed adaptively predistorting the transmitted signal in such a way that the desired constellation is achieved after passing through the nonlinearity. While this is effective, it requires additional hardware, essentially a receiver, in the transmitter. Such additional hardware is a disadvantage for many power/size limited transmitters.

Other solutions focus on receive-side signal processing, and others have proposed the use of nonlinear equalizers in the form of Volterra filters. While these may be effective, the potentially large parameter space and sensitivity to noise remains an issue in some applications. The technique of the present invention is robust in the presence of channel noise, requires no additional transmit hardware, and has modest receiver hardware needs. The present invention builds upon work in the magnetic storage channel and digital communications fields to essentially extend the random access memory-decision feedback equalizer (RAM-DFE) idea to reduce "precursor" nonlinear ISI components. The "precursor" effects can be significant. Further, since a trellis detector or decoder is usually involved, the present invention incorporates the RAM into the trellis detector or decoder.

The present invention provides a unique approach to addressing the problem of ISI. A subset of RAM inputs is searched for the ISI yielding a minimum branch metric error. In the preferred embodiment, a RAM search method is used in cooperation with a Viterbi detector. The present invention is also compatible with Viterbi decoding, when the application is a communication channel with convolutional coding, and with BCJR-APP (acronym known to those of ordinary skill in the error-correcting codes art for "Bahl, Cocke, Jelinek and Raviv—A Posteriori Probabilities", as set forth in L. R. Bahl, et al., "Optimal Decoding of Linear Codes for Minimizing Symbol Error Rate", IEEE Trans. Info. Theory, Vol IT-20, pp. 284–287, March 1974) detection and decoding when the application involves turbo codes.

Prior patents that disclose related technology include: U.S. Pat. No. 5,430,661, to Fisher et al., entitled "Adaptive Decision Feedback Equalizer Apparatus for Processing Information Stored on Digital Storage Media;" U.S. Pat. No. 5,132,988, to Fisher et al., entitled "Adaptive Decision Feedback Equalizer Apparatus for Processing Information Stored on Digital Storage Media;" U.S. Pat. No. 5,426,541, to Coker et al., entitled "Self-Equalization Method for Partial-Response Maximum-Likelihood Disk Drive Systems;" U.S. Pat. No. 5,418,660, to Sato et al., entitled "Information Processing Apparatus for Processing Reproduction Signal Having Nonlinear Characteristics;" U.S. Pat. No. 5,414,571, to Matsushige et al., entitled "Adaptive Equalization Circuit for Magnetic Recording Apparatus Having High Error Immunity;" U.S. Pat. No. 5,703,903, to Blanchard et al., entitled "Method and Apparatus for Adaptive Filtering in a High Interference Environment;" U.S. Pat. No. 5,742,642, to Fertner, entitled "Signal Processing Method and Apparatus for Reducing Equalizer Error;" U.S. Pat. No. 4,852,090, to Borth, entitled "TDMA Communications System with Adaptive Equalization;" U.S. Pat. No. 5,107,378, to Cronch et al., entitled "Adaptive Magnetic Recording and Readback System;" and U.S. Pat. No. 5,166,914, to Shimada et al., entitled "Data Recording/Reproducing Apparatus with Two-Dimensional Equalizer for Crosstalk Cancellation." These references provide related technologies, however most do not utilize RAM-DFE techniques. The '661 and '988 patents to Fisher et al., disclose the use of a decision feedback equalizer; however, they introduce a design of a RAM-DFE that is capable only of mitigating the nonlinear ISI caused by post-cursor symbols. This would be effective when most of the nonlinear ISI is post-cursor, but when the precursor nonlinear ISI is significant, its effectiveness becomes marginal. The present invention introduces a solution to this problem by searching over all possible combinations of the precursor symbols while fixing the post-cursor symbols to past decisions. Then, the combination that gives the optimal branch metric is used, along with the post-cursor samples, to address the RAM. This method is termed RAM-search because it borrows the notion of employing a RAM from the RAM-DFE, and because it involves a search. The preferred embodiment of the present invention is termed the RAM-search-Viterbi-detector (RS-VD). The RS-VD uses a RAM-search method in cooperation with a Viterbi algorithm. This algorithm shows a considerable performance improvement in the bit error rate over other algorithms. This is due to the fact that post-cursor symbols are more reliable, and the error propagation is reduced. In summary, the present invention cancels both precursor and post-cursor linear and nonlinear ISI.

SUMMARY OF THE INVENTION (DISCLOSURE OF THE INVENTION)

The present invention is a method of canceling intersymbol interference (ISI) for a signal bit $a_k$ at time k, where $k \in \{0, \pm 1, \pm 2 \ldots\}$ in data transmission and data storage channels, such as in magnetic recording, optical recording, image processing, image coding, satellite communications, wireline communications such as telephone lines, and wireless communications such as digital cellular telephones. The method is comprised of the steps of modelling the channel; training a RAM with known values for $a_k$ to acquire the model of the channel; searching for the optimal address for the RAM with past, present and future values of $a_k$ that will be used to cancel the ISI in the received signal; and canceling the ISI from the received signal. The training step comprises training with a training update algorithm. The modelling step can comprise modelling with a simple partial erasure model to produce a discrete time signal. The training step can comprise acquiring a model for a magneto-inductive head or a magneto-resistive head, or some other nonlinear channel model. The method can further comprise the step of equalizing the discrete time signal to a desired partial response target. Equalizing can be accomplished with either a long MMSE FIR filter equalizer or a zero-forcing equalizer. The partial response target can be a PR4 or an EPR4 if a partial response target is used. If a partial response target is used, the discrete time signal can be expanded into a Volterra series. When modelling the magneto-resistive head, it is preferably modelled as a memoryless device with a transfer function. Modelling with a transfer function can be characterized by a third-order polynomial. When modelling with a transfer function, asymmetry and saturation effects can be incorporated into the transfer function to produce the discrete time signal. Preferably, the discrete time signal is then filtered with a matched filter.

As with the magneto-inductive head, the magneto-resistive head's discrete time signal can be equalized with an MMSE equalizer. In the method for canceling intersymbol interference, searching preferably comprises searching for the optimal bit combination in the feedforward path of $a_k$ that when used to address the RAM, minimizes the ISI for $a_k$.

In the preferred embodiment for canceling intersymbol interference, the searching step is done in cooperation with decision-making on the data symbol values. The decision-making is accomplished with a detector which can be either a Viterbi detector, a Viterbi decoder, a BCJR-APP detector, or a BCJR-APP decoder. Preferably, each trellis state of the detector detection algorithm is equipped with the RAM trained with the channel model. Searching is then accomplished by deriving the address for the RAM from the paths into the trellis state of the detection algorithm, together with future $a_k$ bits. To derive the address, the branch metric of the detection algorithm is modified according to the minimum squared error of the ISI for $a_k$.

The present invention is also for an apparatus for canceling intersymbol interference for a signal bit $a_k$ at time k, where $k \in \{0, \pm 1, \pm 2, \ldots\}$ in data transmission and data storage channels. The apparatus is comprised of means for modelling the channel; a RAM trained with known values for $a_k$ to acquire the model of the channel; means for searching for the optimal address for the RAM with past, present and future values of $a_k$ to be used in minimizing ISI in the received signal; and means for canceling the ISI. Preferably, the means for searching further comprises a decision maker such as a Viterbi detector, Viterbi decoder, BCJR-APP detector, or BCJR-APP decoder. Means for modelling, searching, decision-making, and canceling include well-known devices in the art such as computer software, firmware on a computer board or digital signal processor, or in hardware such as an integrated circuit.

A primary object of the present invention is to circumvent error propagation that arises in making tentative decisions in ISI-cancellers used in data storage channels and in data transmission channels.

A primary advantage of the present invention is that improvements of about three decibels are possible.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate a preferred embodiment of the present invention and, together with the description, serve to a explain the principles of the invention. The drawings are only for the purpose of illustrating a preferred embodiment of the invention and are not to be construed as limiting the invention. In the drawings.

Figure 1:
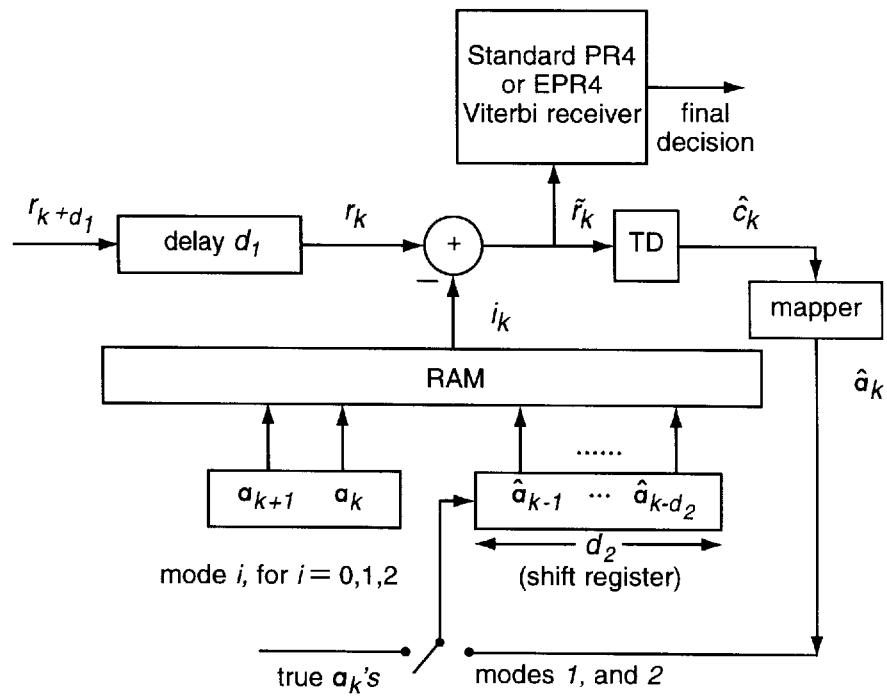
FIG. 1 is a schematic diagram of a RAM-based nonlinear ISI canceller.
Figure 1:
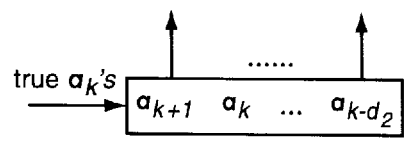
Figure 1:
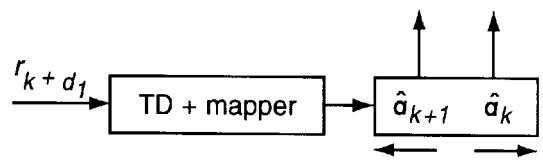
Figure 1:
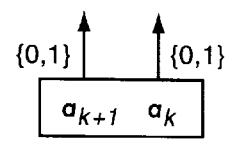

DESCRIPTION OF THE PREFERRED EMBODIMENTS (BEST MODES FOR CARRYING OUT THE INVENTION)

In the usual linear model, the read signal of random access memory is of the form:

$$z(t) = \sum_k a_k [h(t - kT_c) - h(t - (k+1)T_c)] + w(t), \quad (1)$$

where $a_k \in \{\pm 1\}$ are the bits recorded on the medium, h(t) is the Lorentzian step response expressible as:

$$h(t) = \frac{1}{1 + \left(\frac{2t}{pw_{50}}\right)^2},$$

w(t) is white Gaussian noise with spectral density $N_0/2$, and $T_c$ is the channel bit duration. Assume the receiver front end is a filter matched to $s(t)=h(t)-h(t-T_c)$ followed by a symbol rate $(1/T_c)$ sampler and a discrete-time equalizer. A discrete time equivalent model of the form (1−D)h(D) follows directly from this, where $(1-D)(1-D^{-1})h(D)h(D^{-1})$ is a factorization of the sampled autocorrelation function, $X_s(D)$, of s(t). Note that h(D) is not simply a sampled version of h(t). This is related to the sampled autocorrelation function, $X_h(D)$, of h(t), through $X_s(D)=(1-D)(1-D^{-1})X_h(D)$ where the $k^{th}$ coefficient of $X_h(D)$ is given by:

$$x_{h,k} = A_0 \frac{S_c}{k^2 + S_c^2},$$

$$k \in \{0, \pm 1, \pm 2, \dots\}.$$

Here $S_c \equiv pw_{50}/Tc$ is the recorded bit density and $A_0$ is a relatively unimportant constant (which is set equal to $S_c$).

Thus, the model in (1) has the discrete-time equivalent:

$$z(D)=a(D)(1-D)h(D)+w(D) \qquad (2)$$

or $$z(D)=b(D)h(D)+w(D), \qquad (3)$$

where $b_k=a_k-a_{k-1}$ nominally takes values in the set $\{0, \pm 2\}$, where $b_k=\pm 2$ only if a transition occurred. In these equations, w(D) is a white Gaussian noise process with a variance of $N_0/2$.

Maqneto-Inductive Model

When the recording density is high, the linear model no longer holds. In particular, the recorded transitions become partially erased, and position-shifted, so that the actual value of $b_k$ becomes a function of the values of its neighbors, i.e., it depends on the number of transitions adjacent to $b_k$. From the model proposed in I. Lee et al., "Performance comparison of receivers in a simple partial erasure model," *IEEE Trans. Magn.*, pp. 1465–1469, July 1994, the transition amplitudes are modified as $\rho_k b_k$ where $\rho_k=1$ if there exist no adjacent transitions, $\rho_k=\gamma$ if there is a single adjacent transition, and $\rho_k=\gamma^2$ if there are two adjacent transitions. Here, $0<\gamma<1$, with the actual value of γ depending on the recording density. The model also assumes recorded transition shifts are eliminated by write precompensation as is commonly done.

With the nonlinear effects of partial erasure included, (3) is modified as:

$$z(D)=\tilde{b}(D)h(D)+w(D) \qquad (4)$$

where the coefficients of $\tilde{b}(D)$ are $\tilde{b}_k=\rho_k b_k$. The discrete time signal z(D) is then equalized to the desired partial response target which can be for example, PR4 or EPR4 (see FIG. 2). Assume a long minimum mean squared error finite impulse response (MMSE FIR) filter equalizer is employed. Thus, the PR4-equalized version of z(D) in (4) is approximated as (approximate since an MMSE equalizer is used as opposed to a zero-forcing equalizer):

$$z_1(D) \cong \tilde{b}(D)(1+D)+n_1(D), \qquad (5)$$

where $n_1(D)$ is the colored noise at the PR4 equalizer output. (The symbol "≅" in this equation refers to the fact that the factor (1+D) is only approximate and the actual polynomial (response) has small "tails." A similar comment holds for the factor $(1+D)^2$ in the next equation.) Similarly, the EPR4-equalized version of z(D) in (4) is approximated as:

$$z_2(D) \cong \tilde{b}(D)(1+D)^2+n_2(D), \qquad (6)$$

where $n_2(D)$ is the colored noise at the EPR4 equalizer output.

Magneto-Resistive Model

The nonlinearities in a magneto-resistive (MR) head are manifested as pulse asymmetry and saturation. Asymmetry occurs when a biased MR head slightly saturates for one polarity. Saturation occurs when the amplitude of the input signal exceeds the linear range of the head in both directions, reducing the peak value of the transition responses.

The nonlinearity due to asymmetry is characterized by the peak asymmetry, $$A = \frac{V_p - V_n}{V_p + V_n}, \qquad (7)$$

where $V_p$ is the positive peak amplitude and $V_n$ is the negative peak amplitude of the MR isolated pulse. The positive asymmetry is due to an underbiased MR head and negative asymmetry is due to an overbiased MR head.

The nonlinearity in the MR head is modelled as a memoryless nonlinear device with a transfer function characterized by the following third-order polynomial:

$$y=f_{nl}(x)=x+\alpha x^2-\beta x^3, \qquad (8)$$

where y and x are the output and input of the nonlinear device, respectively. α and β correspond to asymmetry and saturation, respectively, and they are usually small positive values.

Figure 3:
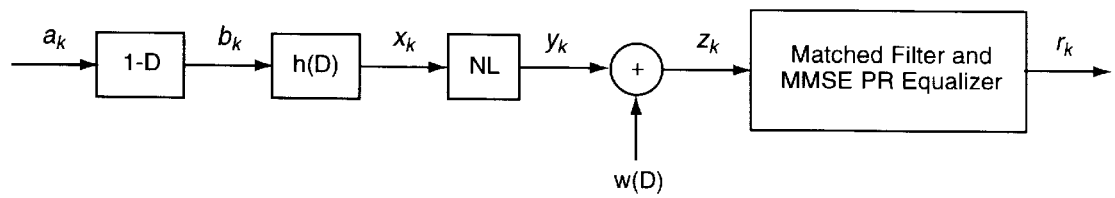
FIG. 3 is a schematic diagram of a magneto-resistive head wherein NL refers to nonlinearity.

To incorporate asymmetry and saturation effects, (3) is modified as:

$$z(D)=f_{nl}(b(D))h(D)+w(D). \qquad (9)$$

z(D) is filtered by the "matched" filter $(1-D^{-1})h(D^{-1})$ and then equalized to the PR4 or EPR4 partial response target with an MMSE equalizer (see FIG. 3).

Algorithm Development

The signal terms in (5) and (6) can be expanded in a Volterra series of the form:

$$\tilde{c}_k = \sum_n K_n a_{k-n} + \sum_r \sum_s \sum_t K_{rst} a_{k-r} a_{k-s} a_{k-t}$$

for some "kernels" $K_n$, $K_{rst}$, etc., and where (at least for this model) the summations are finite. The first term represents the usual linear ISI, and the other terms represent third-order nonlinear ISI. It is evident from this expression why nonlinear ISI cancellation becomes problematic. First, there is really no "precursor" and "post-cursor" ISI as these nonlinear ISI terms can be of the form $a_{k+1}a_k a_{k-2}$, $a_k a_{k-1} a_{k-2}$, etc. This explains why, even under ideal conditions, the RAM-DFE can offer only partial nonlinear ISI mitigation: only the past decisions, $\hat{a}_{k-1}$, $\hat{a}_{k-2}$, $\hat{a}_{k-3}$, . . . , are fed back for ISI cancellation.

The second difficulty with nonlinear ISI cancellation is, because partial response signaling is involved, the receiver sees noisy, distorted linear combinations $c_k$, of the $a_k$'s ($c_k = a_k - a_{k-2}$ for PR4 and $c_k = a_k + a_{k-1} - a_{k-2} - a_{k-3}$ for EPR4). Thus, the $a_k$ decisions must be computed from the $c_k$ decisions if ISI is to be canceled. For PR4, the $a_k$ decisions may be computed as:

$$\hat{a}_k = \hat{c}_k/2 \text{ when } \hat{c}_k = \pm 2$$

$$\hat{a}_k = \hat{a}_{k-2} \text{ when } \hat{c}_k = 0 \quad (11)$$

which follows directly from the relation $c_k = a_k - a_{k-2}$. Thus, an error in $\hat{a}_{k-2}$ will propagate for as long as $\hat{c}_k = 0$. It will correct itself when $\hat{c}_k = \pm 2$ and $\hat{c}_k$ is correct. The situation is worse for EPR4 since it has a longer response, making error propagation more likely.

Attention is now turned to FIG. 1. Consider the RAM ISI canceller in FIG. 1, mode 1. Observe that since past, present, and future values of $\hat{a}_k$ are required for ISI cancellation, i.e., to address the RAM, a tentative decision operation of the form described in (11) is necessary in a feedforward as well as a feedback path. While error propagation is expected in the fed back decisions $\hat{a}_{k-1}, \hat{a}_{k-2}, \ldots$, the situation is much worse for the feedforward decisions $\hat{a}_k, \hat{a}_{k+1}, \ldots$ Since no ISI has been subtracted on the feedforward path, it is more prone to errors and, hence, error propagation.

Note that the algorithm assumes essentially perfect knowledge of the nonlinear channel model in the form of the RAM which has been trained as in FIG. 1, mode 0. The training update algorithm used is:

$$\text{RAM}(a_k) \leftarrow \text{RAM}(a_k) + \mu \text{sign}(\tilde{r}_k - \tilde{c}_k) \quad (12)$$

where $\tilde{r}_k \triangleq r_k - \text{RAM}(\hat{a}_{k+d_1-1}, \ldots, \hat{a}_{k-d_2})$, $a_k = (a_{k+d_1-1}, \ldots, a_k, \ldots)$, Choi, S., et al., "Performance of Neural Equalizers on Partial Erasure Model," *IEEE Transactions on Magnetics*, vol. 33, No. 5, pp 2788–2790 (Sep. 1997). $a_{k-d_2}$ is a vector of bits in the training sequence, and $d_1$ and $d_2$ are parameters which specify how many future and present ($d_1$) and how many past ($d_2$) values of $a_k$ are present in the expression for the distorted sample $\tilde{c}_k$ in (10). For PR4, $d_1=2$ and $d_2=3$ is used, and $d_1=2$ and $d_2=4$ is used for EPR4. (In general $d_1$ need not be equal to 2, for example in satellite communications.) The parameter $\mu$ in (12) is the usual adaptation step size set to some small number (e.g., $\mu=0.001$).

RAM-Search (RS) Method

The above error propagation problem leads to the RS method, which is a precursor to the present invention. The RAM-search method is fully described in Applicant's "RAM-Search Algorithms for Nonlinear ISI Cancellation in Magnetic Recording," presented at GLOBECOM, Sydney, Australia, Nov. 8–12, 1998, and in LeBlanc et al., "Pre-Cursor Extended RAM-DFE Canceller (PERC) Nonlinear Equalizer for Nonlinear ISI Channels," presented at IEEE DSP Workshop, Bryce Canyon, Utah, Aug. 9–12, 1998, and the information therein is herein incorporated by reference. In RS, the focus is on the $a_k$ decisions in the feedforward path as it is more likely to propagate errors. In this algorithm, the $(\hat{a}_{k+1}, \hat{a}_k) = (i, j)$ combination, of which there are only four, is searched for which minimizes:

$$|\tilde{r}_k - \hat{c}_k| = |r_k - \text{RAM}(i, j, \hat{a}_{k-1}, \ldots, \hat{a}_{k-d_2}) - \hat{c}_k|.$$

The optimal pair (i*, j*) is then used to address the RAM in the computation of the Viterbi receiver input $\tilde{r}_k = r_k \text{RAM}(\hat{a}_{k-1}, \ldots, \hat{a}_{k-d_2})$. Thus, unless "fooled" by the noise, it is expected that the correct (i, j) pair has been found, and the correct ISI value has been subtracted. Further, since each four-way search is independent of any other, the method avoids error propagation.

If this method is expanded to eliminate feedback error propagation, the search would have to be among $2^{d_1+d_2}=2^5$ addresses for PR4 (RS5) and $2^6$ addresses for EPR4 (RS6). Along with the fact that there are now many addresses among which to search, the likelihood of choosing the correct one, in the face of noise, is quite small. This leads to the preferred embodiment of the present invention.

The RAM-Search/Viterbi-Detector (RS-VD) Method

In the RS-VD method, the preferred embodiment, the RAM search routine works in cooperation with a Viterbi detection or decoding algorithm, or BCJR-APP algorithm, rather than independently of it. For this case, there are no explicit tentative decision elements, and FIG. 1 is no longer relevant, except for mode 0. Rather, each trellis state is equipped with the RAM model, and the address for the RAM is derived from the paths into the state together with a "look-ahead" bit $\hat{a}_{k+1}=i$ to be searched over.

In the standard Viterbi algorithm, the cumulative metric, $m_s(k)$ for state s at time k is updated according to:

$$m_s(k) = \min \{\lambda(s', s) + m_{s'}(k-1), \lambda(s'', s) + m_{s''}(k-1)\}$$

where $\lambda(s', s)$ is the branch metric for the transition from state s' to state s, s" is the other state leading to state s, and the other quantities are obviously defined. The branch metric $\lambda(s', s)$ is given by:

$$\lambda(s', s) = (r_k - c_k)^2$$

where $c_k = c_k(s', s)$ is the nominal channel symbol output corresponding to the transition s'→s. The branch metric $\lambda(s'', s)$ is similarly defined.

For the RS-VD method with $d_1=2$, the branch metric $\lambda(s', s)$ is modified as:

$$\lambda(s', s) = \min_i [r_k - c_k - \text{RAM}(i, \hat{a}_k, \hat{a}_{k-1}, \ldots, \hat{a}_{k-d_2})]^2 \quad (13)$$

where $\hat{a}_k, \hat{a}_{k-1}, \ldots, \hat{a}_{k-d_2}$ are the channel input branch labels for the contending path leading into state s at time k which previously went through state s' at time k−1. The expression for the case $d_1$ not equal to 2 is straightforward from (13). A similar expression applies to the s"→s branch metric.

Note by choosing RAM addresses based on the candidate path under consideration, error propagation is avoided provided the set of candidate paths includes the correct path. If the correct path is not included, then errors will propagate as a result of incorrect addresses being used in the branch metrics given by (13).

The above discussion referred to the development of the nonlinear ISI cancellation; however, the present invention can of course be implemented to cancel both linear and nonlinear ISI and will be apparent to those skilled in the art. Furthermore, the embodiment described above is discussed in conjunction with magnetic recording media. However, the present invention has many applications in all types of data transmission and data storage channels. In particular, RS-VD is compatible with any use of the Viterbi algorithm. Example applications for the present invention include image processing, image coding, satellite communications, wireline communications such as telephone lines, wireless communication such as digital cellular telephones, magnetic recording, and optical recording. Although Viterbi detection is discussed, Viterbi decoding is applicable as well when the context is a communication channel with convolutional coding. It will be apparent to those skilled in the art that RAM can also be incorporated into any Viterbi-like processor, such as the BCJR-APP processor used in turbo decoding. Other technologies that the present invention is compatible with will be apparent to those skilled in the art, and the foregoing description is not meant to limit the applications of the present invention.

Figure 8:
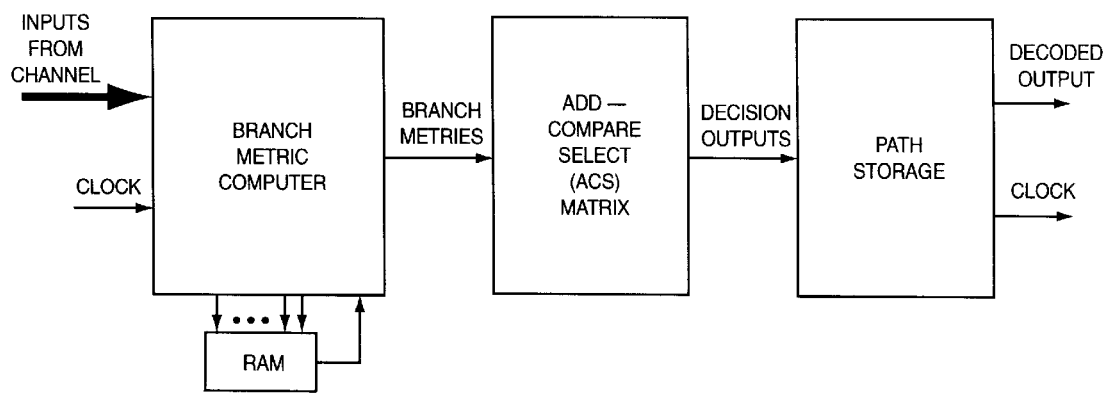
FIG. 8 is a block diagram of the preferred embodiment of a high-level RS-VD according to the present invention.
Figure 9:
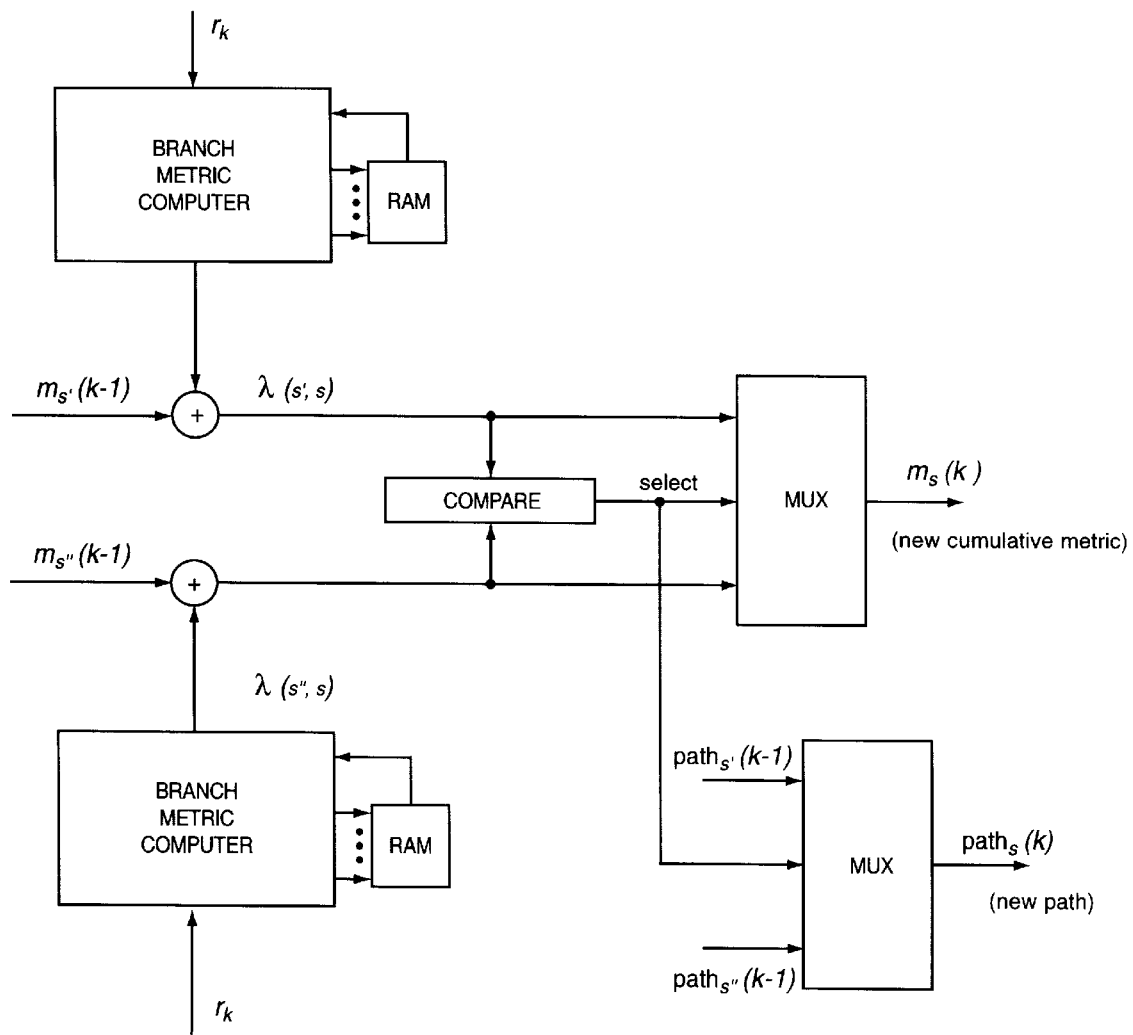
FIG. 9 is a block diagram of an add-compare-select circuit for a binary trellis.

Implementation of the RS-VD method can be accomplished by training a RAM to model nonlinear ISI, using past, present, and future data symbol values using conventional means. Once trained, the RAM output can be used to cancel nonlinear ISI (nonlinear distortion) by using a modified branch metric in a Viterbi detector or Viterbi decoder as discussed above. This modified branch metric is found by equipping each Viterbi trellis state with a fully trained RAM and then employing the RAM-search (RS) algorithm to determine the proper RAM address and, from this, the modified branch metric. A high-level block diagram of RS-VD is presented in FIG. 8. A functional block diagram of an add-compare-select circuit for binary trellis is presented in FIG. 9. FIG. 9 can be generalized to any trellis.

Implementation of RS into a BCJR-APP algorithm (RS-BCJR-APP) can be accomplished by training a RAM to model nonlinear ISI, using past, present, and future data symbol values using conventional means. Once trained, the RAM output can be used to cancel nonlinear ISI (nonlinear distortion) by using a modified branch metric in a BCJR-APP, or log-BCJR-APP, detector or decoder. This modified branch metric is found by equipping each trellis state with a fully trained RAM and then employing the RS algorithm to determine the proper RAM address and, from this, the modified branch metric.

These implementations may be accomplished with known means for modelling, searching, decision-making, and canceling, for example via software on a computer, in firmware on a computer board or digital signal processor, or in hardware such as an integrated circuit. Once the algorithm is known, implementation will be readily apparent to those skilled in the art.

Industrial Applicability

The invention is further illustrated by the following non-limiting examples.

EXAMPLE 1

Magneto-Inductive Model

Figure 2:
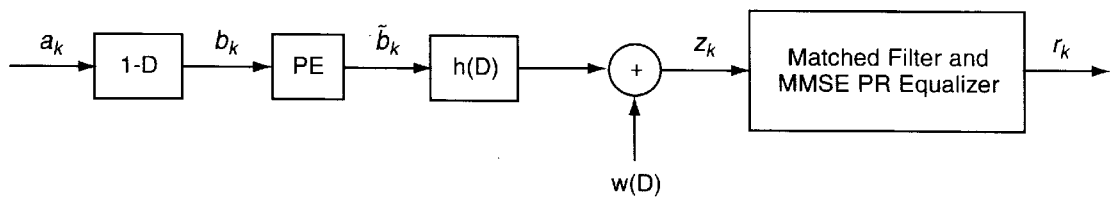
FIG. 2 is a schematic diagram of a model of a magneto-inductive head wherein PE refers to partial erasure.

The simulation diagram for both PR4 and EPR4 is shown in FIG. 2 and corresponds to the mathematical models given in the above equations (5) and (6). Assume a recording density of $S_c=2.0$ for PR4 and $S_c=3.0$ for EPR4. Thus, the noise processes in (5) and (6) correspond to the colored noise at the output of the PR4 and EPR4 equalizers designed for these densities. Further, assume $\gamma=0.8$ for PR4 and $\gamma=0.7$ for EPR4. (These values are not based on actual channel measurements. Rather, they are chosen simply to demonstrate the effectiveness of the above algorithms.)

Figure 4:
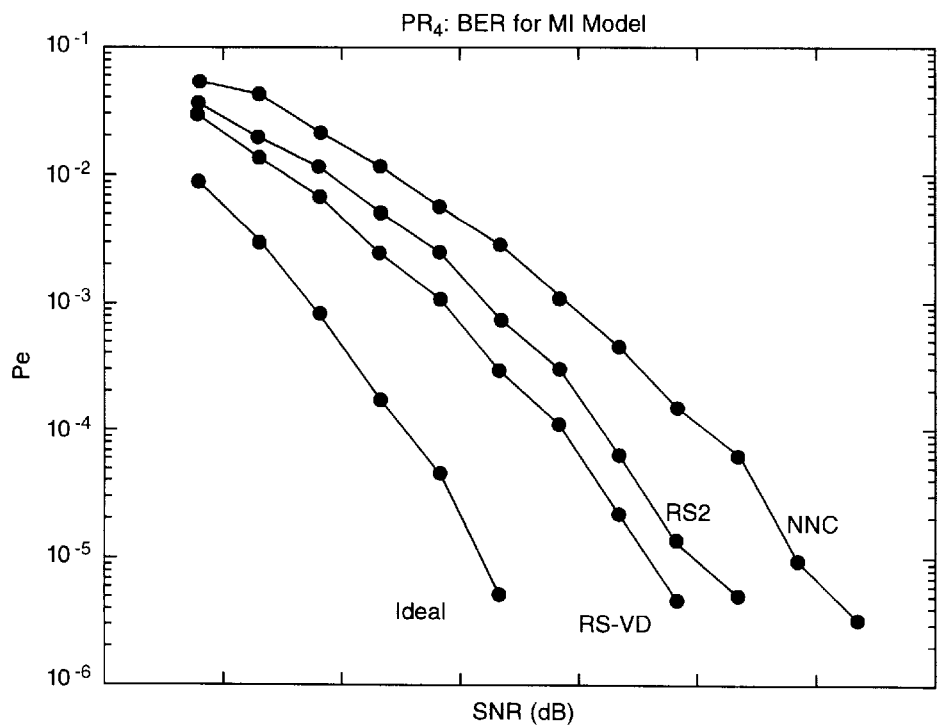
FIG. 4 is a graph that shows PR4 at $S_c=2.0$ and $\gamma=0.8$.

FIG. 4 presents the bit error probability ($P_b$) results for the PR4 case. $P_b$ is plotted against $E_c/N_0$ where $E_{c\Delta F[\bar{c}_k{}^2]}$ is the expected energy of the distorted channel samples $\bar{c}_k$ and $N_0/2$ is the variance of the white noise samples entering the PR4 equalizer. Included in FIG. 4 as a basis for comparison are the curves for no nonlinear compensation (NNC) with a Viterbi detector and the "ideal" situation for which the $a_k$'s are known so that the RAM address is always correct. (Note that FIG. 1, mode 1, performance is about equal to that of no nonlinear ISI cancellation.) Observe that the RS method alone provides an improvement of 1.7 dB at $P_b=10^{-5}$ over the NNC error rate curve. The RS-VD method provides an improvement of 2.6 dB. The latter is about 2.7 dB from the ideal curve at $P_b=10^{-5}$.

Figure 5:
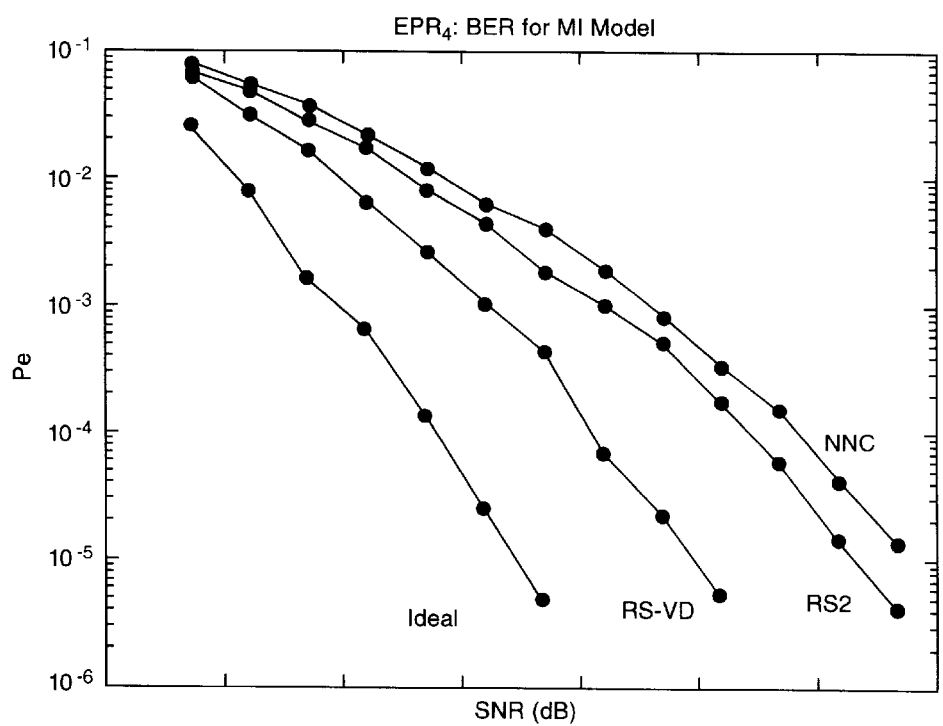
FIG. 5 is a graph showing EPR4 at $S_c=3.0$ and $\gamma=0.7$.

The EPR4 results are presented in FIG. 5. In this case, the improvement provided by the RS method over the NNC error rate curve is 0.9 dB at $P_b=10^{-5}$. The improvement provided by the RS-VD method is 3.2 dB. Also, the RS-VD algorithm performance is about 2.8 dB from the ideal curve.

EXAMPLE 2

Magneto-Resistive Model

The simulation diagram for this example is shown in FIG. 3. In this case, assume a recording density of $S_c=2.0$ for PR4 and $S_c=3.0$ for EPR4. Further, for both PR4 and EPR4, assume an asymmetry parameter of $\alpha=0.25$, which corresponds to a peak asymmetry of 30%, and a saturation parameter of $\beta=0.15$. (These values assume that the peak magnitude for x in equation (8) is unity.)

Figure 6:
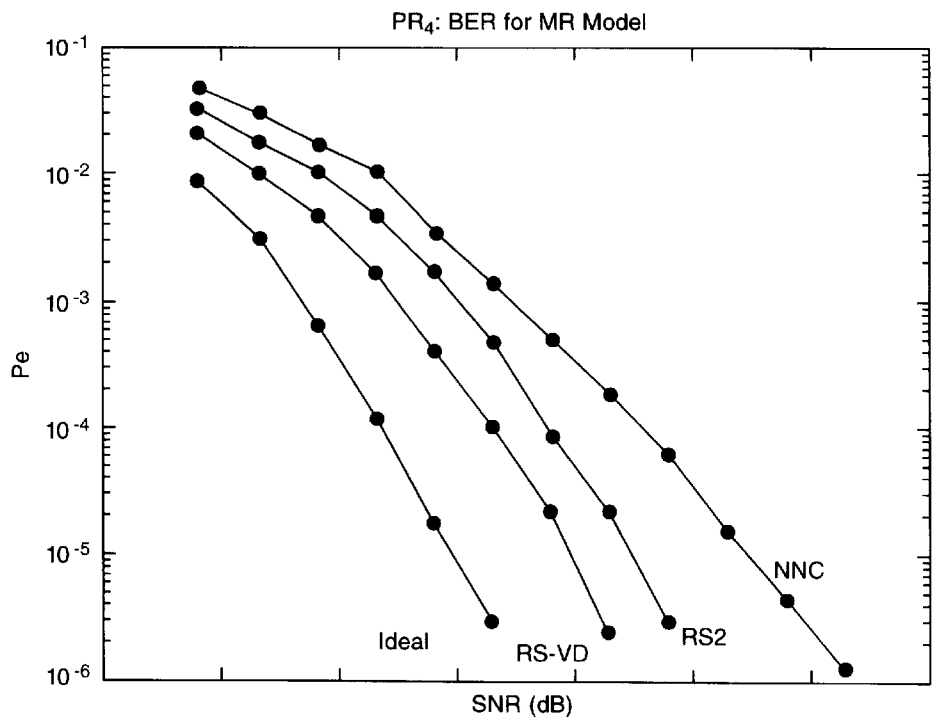
FIG. 6 is a graph showing PR4 at $S_c=2.0$, $\alpha=0.25$ and $\beta=0.15$.

Simulation results for the PR4 case are presented in FIG. 6. Observe that the RS method achieves a performance improvement of 1.9 dB at $P_b=10^{-5}$ over the NNC error rate curve. The RS-VD method achieves an improvement of 2.6 dB at $P_b=10^{-5}$ over the NNC error rate curve. Also, the RS-VD method is 2.1 dB from the ideal curve.

Figure 7:
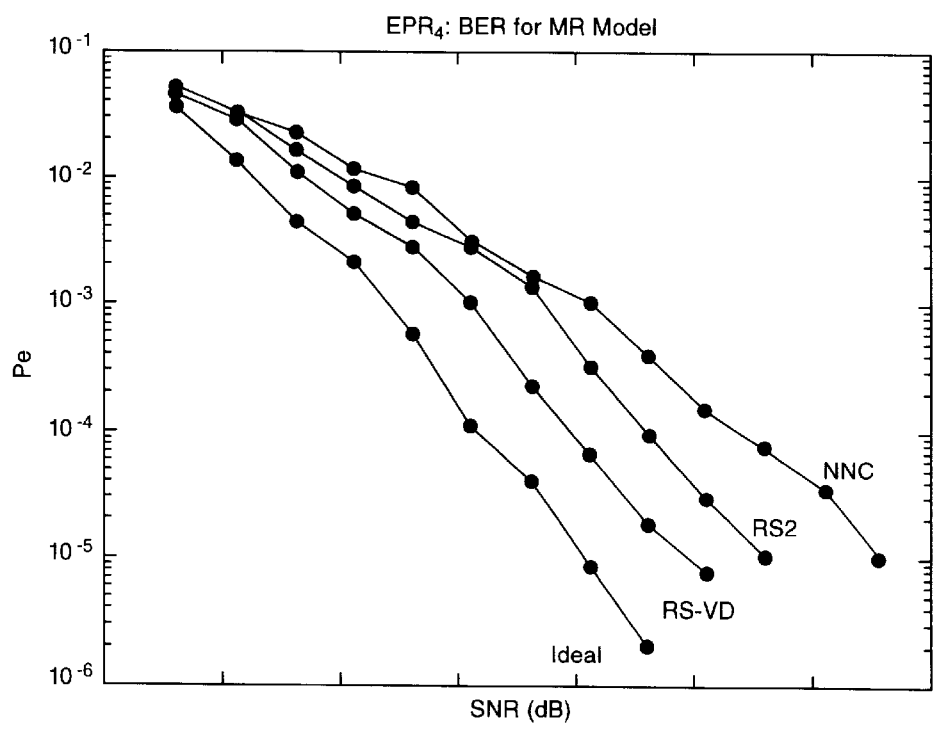
FIG. 7 is a graph showing EPR4 at $S_c=3.0$, $\alpha=0.25$ and $\beta=0.15$.

The results for the EPR4 case are presented in FIG. 7. Observe that RS achieves a perfoffance improvement of 1.8 dB at $P_b=10^{-5}$ over the NNC error rate curve. The RS-VD method achieves an improvement of 2.9 dB at $P_b=10^{-5}$ over the NNC error rate curve. Also, the RS-VD method is about 1.9 dB from the ideal curve.

The preceding examples can be repeated with similar success by substituting the generically or specifically operating conditions of this invention for those used in the preceding examples.

Although the invention has been described in detail with particular reference to this preferred embodiment, other embodiments can achieve similar positive results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of canceling intersymbol interference (ISI) for a signal bit $a_k$ at time k, where $k \in \{0, \pm1, \pm2, \ldots\}$ in data transmission and data storage channels, the method comprising the steps of:

a) modelling a channel;

b) training a RAM with known values for $a_k$ to acquire the model of the channel;

c) searching for an optimal address for the RAM, with past, present, and future values of $a_k$, to be used to cancel ISI in the received signal; and d) canceling ISI from the received signal.

2. The method of claim 1 wherein the training step comprises training with a training update algorithm.

3. The method of claim 1 wherein the modelling step comprises modelling with a partial erasure model to produce a discrete time signal.

4. The method of claim 3 wherein the training step comprises acquiring a model for a magneto-inductive head.

5. The method of claim 4 further comprising the step of equalizing a discrete time signal to a desired partial response target.

6. The method of claim 5 wherein the equalizing step comprises equalizing with an equalizer selected from the group consisting of long MMSE FIR filter equalizers and zero-forcing equalizers.

7. The method of claim 5 wherein the equalizing step comprises equalizing the discrete time signal to a partial response target selected from the group consisting of PR4 and EPR4.

8. The method of claim 7 further comprising the step of expanding the terms from the discrete time signal in a Volterra series.

9. The method of claim 1 wherein the training step comprises acquiring a model for a magneto-resistive head.

10. The method of claim 9 wherein the modelling step comprises modelling a magneto-resistive head as a memoryless device with a transfer function.

11. The method of claim 10 wherein the modelling step comprises modelling with a transfer function characterized by a third-order polynomial.

12. The method of claim 10 further comprising the step of incorporating asymmetry and saturation effects with the transfer function to produce a discrete time signal.

13. The method of claim 12 further comprising the step of filtering the discrete time signal with a matched filter.

14. The method of claim 13 further comprising the step of equalizing the discrete time signal to a partial response target.

15. The method of claim 14 wherein the equalizing step comprises equalizing with an MMSE equalizer.

16. The method of claim 14 wherein the equalizing step comprises equalizing the discrete time signal to a partial response target selected from the group consisting of PR4 and EPR4.

17. The method of claim 1 wherein the searching step comprises searching for an optimal bit combination in the feedforward path of $a_k$ that when used to address the RAM minimizes ISI for $a_k$.

18. The method of claim 1 wherein the searching step comprises searching in cooperation with decision-making.

19. The method of claim 18 wherein decision-making comprises detecting with a detector selected from the group consisting of Viterbi detectors and BCJR-APP detectors.

20. The method of claim 19 further comprising equipping each trellis state of the detector with RAM trained with the nonlinear channel model.

21. The method of claim 20 wherein the searching step comprises deriving an address for the RAM from paths into the trellis state of the detector together with future $a_k$ bits.

22. The method of claim 21 wherein the deriving step comprises modifying the branch metric of the detector according to minimum squared error of ISI for $a_k$.

23. The method of claim 18 wherein decision-making comprises decoding with a decoder selected from the group consisting of Viterbi decoders and BCJR-APP decoders.

24. The method of claim 23 further comprising equipping each trellis state of the decoder with RAM trained with the channel model.

25. The method of claim 24 wherein the searching step comprises deriving an address for the RAM from paths into the trellis state of the decoder together with future $a_k$ bits.

26. The method of claim 25 wherein the deriving step comprises modifying the branch metric of the decoder according to minimum squared error of ISI for $a_k$.

27. An apparatus for canceling intersymbol interference (ISI) for a signal bit $a_k$ at time k, where $k \in \{0, \pm 1, \pm 2, \ldots\}$ in data transmission and data storage channels, said apparatus comprising:

means for modelling a channel;

a RAM trained with known values for $a_k$ to acquire said model of said channel;

means for searching for an optimal address for said RAM, with past, present, and future values of $a_k$, to be used in minimizing ISI in the received signal; and means for canceling said ISI from said received signal.

28. The apparatus of claim 27 wherein said means for searching comprises a decision-maker.

29. The apparatus of claim 28 wherein said decision-maker comprises a detector selected from the group consisting of Viterbi detectors and BCJR-APP detectors.

30. The apparatus of claim 28 wherein said decision-maker comprises a decoder selected from the group consisting of Viterbi decoders and BCJR-APP decoders.

* * * * *